United States Patent [19]

Sato

[11] Patent Number: 4,643,009
[45] Date of Patent: Feb. 17, 1987

[54] STEERING LOCK ARRANGEMENT

[75] Inventor: Hidekazu Sato, Kasukabe, Japan

[73] Assignee: Kokusan Kinzoku Kogyo Kabushiki Kaisha, Tokyo, Japan

[21] Appl. No.: 683,043

[22] Filed: Dec. 18, 1984

[51] Int. Cl.⁴ .................. B60R 25/02; E05B 65/12; E05B 43/00

[52] U.S. Cl. ........................................ 70/252; 70/271

[58] Field of Search ............... 70/275, 276, 277, 278, 70/279, 280, 249, 252, 271; 292/144; 74/801; 180/287, 271

[56] References Cited

U.S. PATENT DOCUMENTS

| | | | |
|---|---|---|---|
| 347,070 | 8/1886 | Sedgwick | 70/275 |
| 421,567 | 2/1890 | Grah | 70/275 |
| 2,478,016 | 8/1949 | Sandberg | 70/252 |
| 3,336,770 | 8/1967 | Parsons | 70/275 |
| 4,250,976 | 2/1981 | Mochida | 70/252 |
| 4,286,305 | 8/1981 | Pilat et al. | 70/278 |
| 4,427,967 | 1/1984 | Maiocco | 70/252 |
| 4,495,786 | 1/1985 | Masaki et al. | 70/252 |

Primary Examiner—Richard E. Moore
Assistant Examiner—Vinh Luong
Attorney, Agent, or Firm—Fleit, Jacobson, Cohn & Price

[57] ABSTRACT

An automotive keyless steering shaft lock arrangement includes a stationary housing; an electric motor mounted in the housing; a gearing unit of the profile shifted type operatively connected with the motor; a rotator operatively connected with output shaft of the gearing unit; and a shaft-locking and unlocking bar cooperatable with the steering shaft in case of the required locking stage.

The steering shaft is provided with one or more magnets embedded in or mounted on the steering shaft. On the other hand, the stationary housing is provided with one or more magnetically responding switches which are connected to an electronic control circuit adapted for control of the locking and unlocking movement of the bar.

9 Claims, 9 Drawing Figures

STEERING LOCK ARRANGEMENT

BACKGROUND OF THE INVENTION

This invention relates to steering lock arrangements. It relates more specifically to those in automotive use.

Conventional and orthodox arrangements of the above kind are naturally of mechanical locks in which the operator or driver of the vehicle inserts a mechanical key into a reception opening formed in and on the lock unit and turns it together with the lock cylinder in either direction for execution of the shaft lock or -unlock.

Recently, however, keyless and electronically controlled steering locks have appeared. In this kind of shaft-lock arrangement, the driver depresses a certain number of button switches in a predetermined order and the lock is automatically released so that the steering shaft may be brought into its freely operable position. Microswitches are employed for the demonstration of the shaft-locking and -unlocking positions, the said microswitches being operated by actuating means preferably in the form of projections on the locking bar or an cooperatively attributed intermediate member therewith, frequently called "hanger".

If, however, aqueous moisture should invade in the interior of the locking mechanism from outside, it would give rise to inviting dangerous malfunction of the microswitches. In fact, indeed, improvement is desired among those skilled in the art to provide effective means against such defect as above, for the purpose of safety guarantee and theft-prevention.

SUMMARY OF THE INVENTION

It is, therefore, an object of this invention to provide an improved safety steering lock capable of obviating malfunction possibility to be caused by moisture invasion.

Further objects will appear as the description proceeds with reference to the accompanying drawings.

DESCRIPTION OF THE PREFERRED EMBODIMENTS

In the following, a preferred embodiment of the invention will be more fully described with reference to the accompanying drawings.

In these drawings, numeral 10 represents part of a conventional steering shaft which is rotatably supported by a ball bearing unit 12 positively supporting in a frame 13. This frame is formed with a hollow cylindrical portion 14 in which the said bearing unit 12 is positively mounted in position under pressure by pressure fit as an example.

In the upper part of the frame 13, there is formed a guide opening 17 kept in communication with the hollow cylindrical space 14 and container chambers 15. The upper part of the frame 13 is closed by a closure lid 16 pressure-fit thereto as shown in a reseparable manner for the purpose of theft-prevention.

Figure 1:
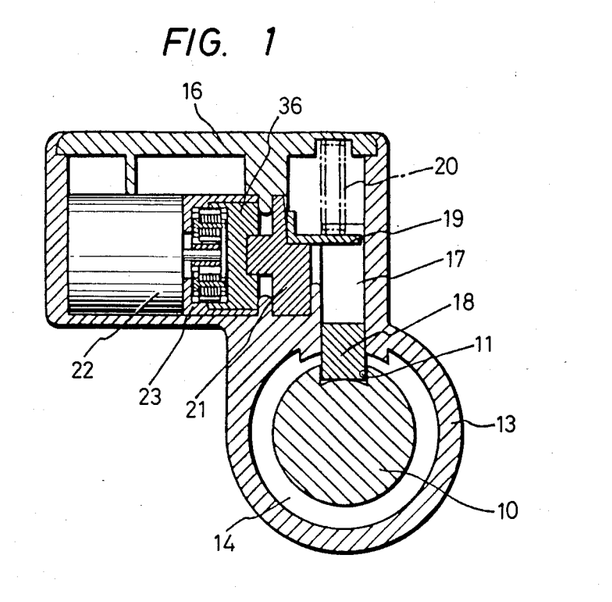
FIG. 1 is a vertical section of a steering shaft lock proper without showing the general electronic circuit cooperating therewith.
Figure 2:
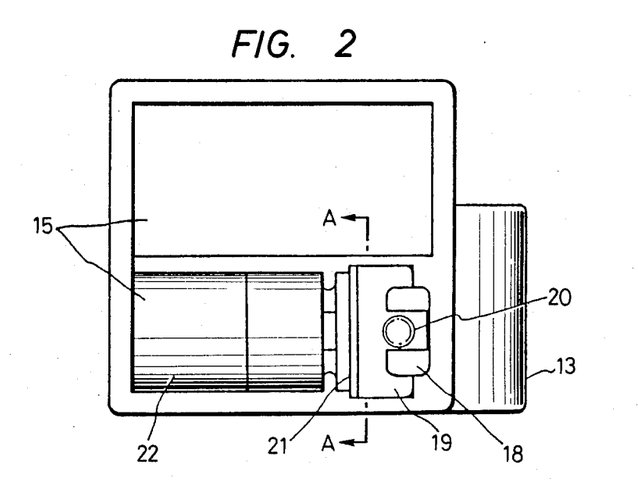
FIG. 2 is a top plan view thereof wherein, however, the housing closure lid has been removed.
Figure 3:
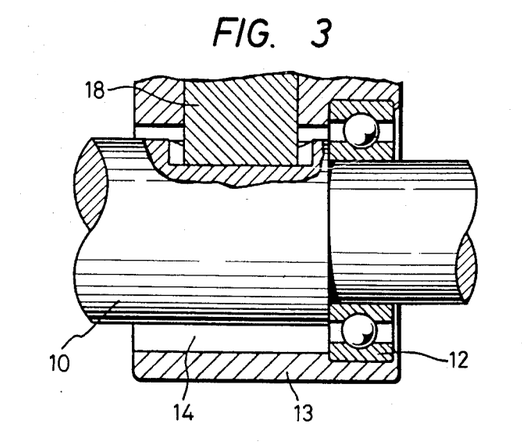
FIG. 3 is a substantially vertical section of the bearing section rotatably supporting the steering shaft, the latter being only partially shown.

A locker bar 18 is slidably mounted in guide opening 17, the said bar being shown in FIG. 1 at its advanced and locking position kept in engagement with a reception recess 11 formed on the steering shaft 10. Sliding motion of locker bar 18 is accompanied by a "hanger piece" or briefly "hanger" 19 so called.

A compression coil spring 20 is mounted between lid 16 and hanger 19 under compression and thus urges the bar 18 to move downwards in FIG. 1. U.S. Pat. No. 4,495,786 to Masaki et al discloses a similar arrangement for movement of a locking bar by engagement of a hanger with a cam.

A member 21 called "rotator" is employed in the present invention. This rotator 21 is kept in pressure contact with the hanger 19, and specifically shown in FIG. 5 in its side view and acts to prevent excess advancement of the bar 18, as will be later more fully described.

An electric motor 22 and a gearing unit 23 are mounted in frame 13 as shown. Rotation is transmitted from the motor 22 through gearing unit 23 to output shaft wheel 36 in succession. Gearing unit 23 is housed in a casing 24 which is shown more specifically in its cross-section in FIG. 4.

In the casing 24, there are provided two diametrally opposite openings 27 and 28 for housing respective contactless lead switches 34 and 35. The former one 34 is adapted for sensing the shaft-unlock position, while the latter senses the shaft-lock position.

When the motor 22 is energized to rotate, output torque is transmitted therefrom through reduction gearing 23, output shaft wheel 36, a mechanical coupling 200 provided between the latter and the rotator 21 and hanger 19 to the locker bar 18, so as to raise the latter from its lock position shown in FIG. 1 towards its unlock position.

Figure 5:
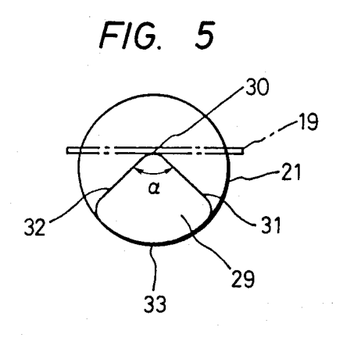
FIG. 5 is a side view of the rotator employed.

As shown in FIG. 5, the rotator 21 is formed with a sector cam 29, having a cam angle alpha of substantially 15–150 degrees, preferably about 90 degrees, ranging between the both sides slopes 31 and 32. During the shaftlocking stage, hanger 19 is kept in pressure contact with rounded cam tip 30 as shown in FIG. 5 under the action of compression spring 20, FIG. 1. Rotator 21 is mechanically connected through output shaft or wheel 36 and gearing unit 23 with motor 22.

The gears of gearing unit 23 may preferably be of profile-shifted type for transmitting larger possible torque and thus enabling the whole unit highly compact.

In the gear case 24 of gearing unit 23, a pair of diametrically opposite openings or slots 27;28 in which respective lead switches 34;35 are mounted. The former lead switch 34 is actuated in access cooperation with a magnet 25 embedded in output shaft or -wheel 36 when the locking bar 18 is raised in position from its shaft locking position by rotation of motor 22 and through gearing 23 and hanger 19 to the unlocking position. In this way, the unlocking position of the bar 18 can be sensed.

On the other hand, the opposite lead switch 35, when the motor is rotated to the locking position, thus the bar 18 arriving at its lockingly engaging position, is actuated by having access with the another and opposite magnet 25. In this way, the locking position of the bar 18 can be sensed.

It may easily occur to any person skilled in the art to replace, if necessary the said lead switchs by microswitches or the like means.

Figure 6A:
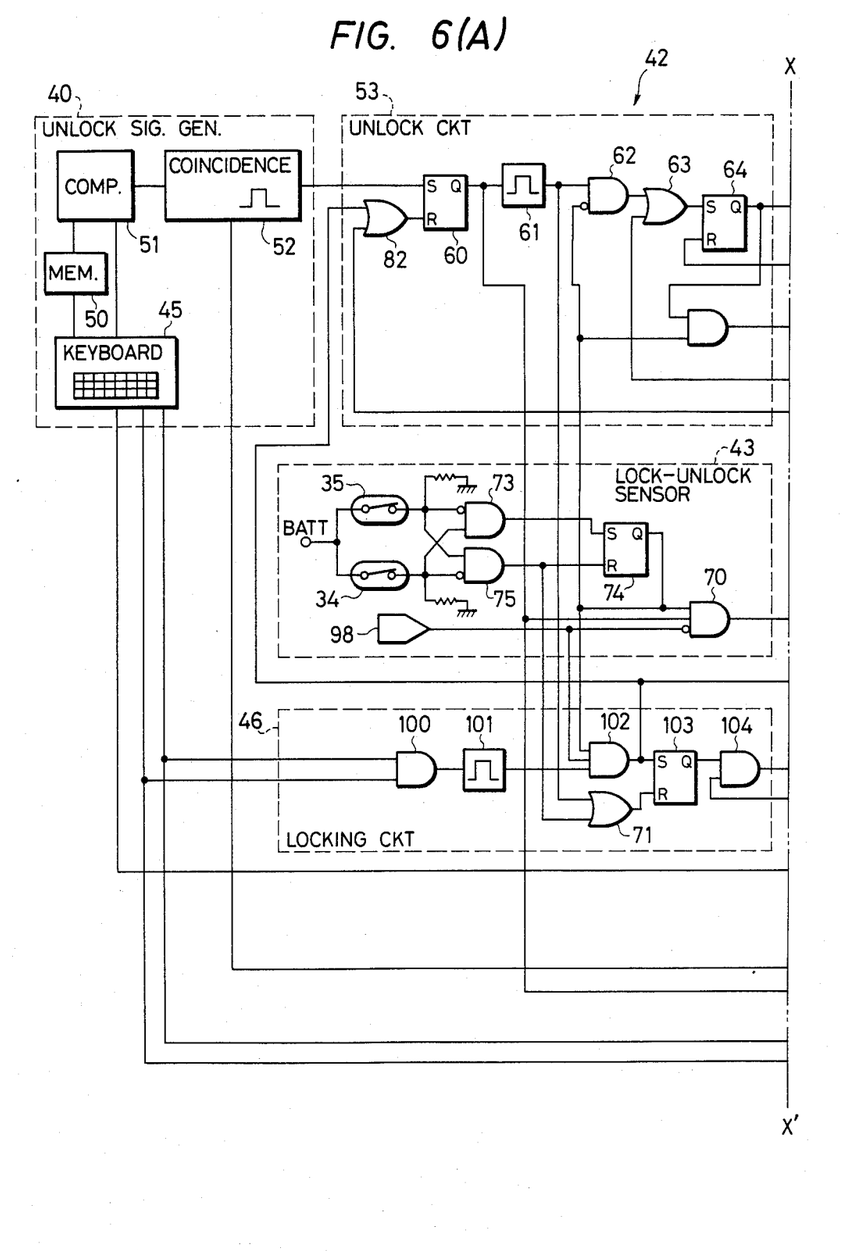
FIG. 6, consisting of two parts, FIG. 6(A) and FIG. 6(B) separated from each other by a section line X—X', is a general electronic circuit arrangement adapted for control of the steering lock and the engine ignition circuit.
Figure 6B:
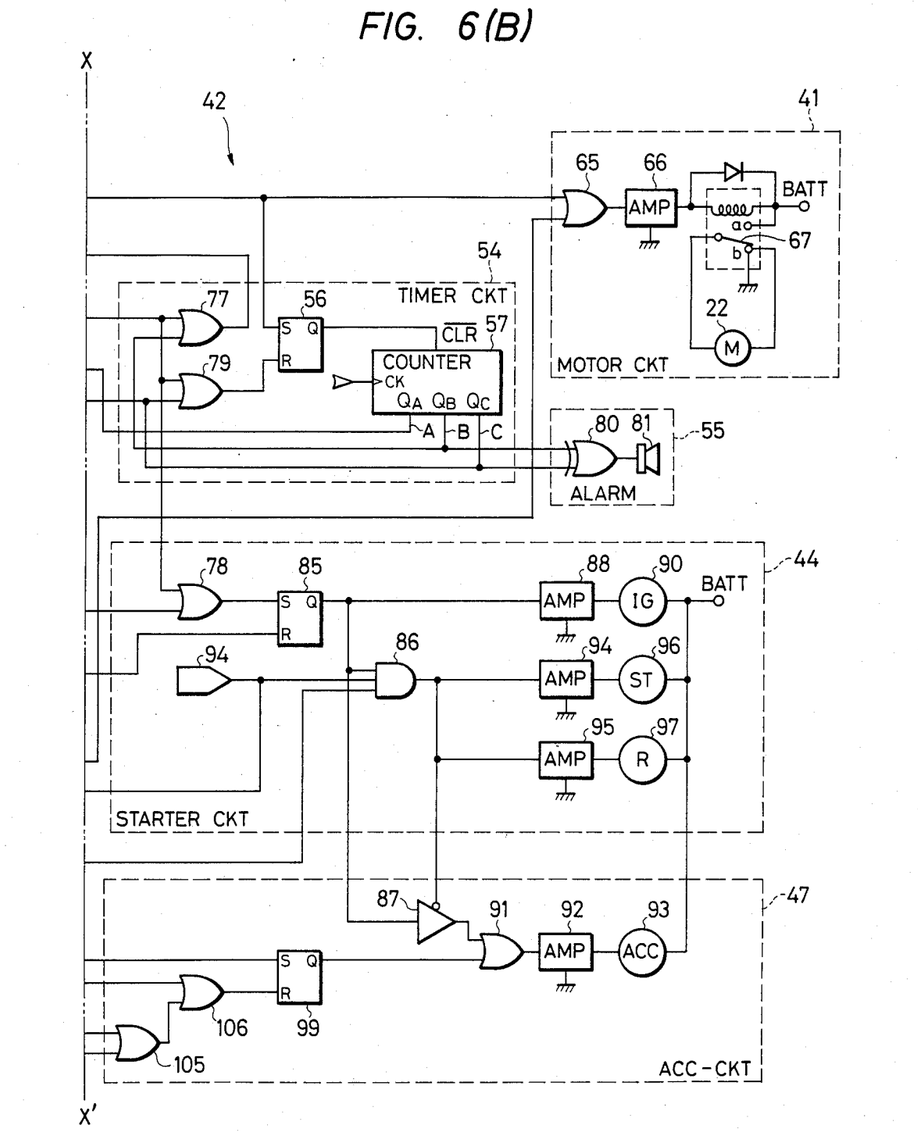

The motor 22 is controlled by a keyless steering lock control circuit which is generally shown in FIG. 6 and having a plurality of button switches arranged in matrix on a switch panel 45.

In this general control circuit, there are an unlock signal generating circuit 40, a motor circuit 41, a bar stick-prevention circuit 42, a lock-and-unlock sensor circuit 43, an engine starter circuit 44, a shaft-locking circuit 46, and an ACC-control circuit 47.

Bar stick-prevention circuit 42 comprises an unlocking circuit 53, a timer circuit 54 and an alarm circuit 55.

Outputs of the button switches of the matrix keyboard 45 are connected to a comparator circuit 51 and several gates as shown.

When selected button switches of the keyboard are depressed so as to send a series of signals representing an intended number of the comparator 51 and comparison is made between it with that stored in the memory 50. When coincidence occurs therebetween, a coincidence signal will be delivered from comparator 51 to coincidence signal output circuit 52, thereby an unlock instruction signal being delivered therefrom.

Then, this instruction signal will be fed to setting terminal S of RS-flip-flop 60 which is thus brought into set position.

Then, the latched signal is delivered from RS-flip-flop 60 through its Q-terminal to one-shot output circuit 61 and AND-gate 70, respectively. Then, the circuit 61 delivers one-shot output to AND-gate 62 and OR-gate 71, respectively. Since the other input terminal of AND-gate 62 is adapted for receiving L-signal from Q-terminal of RS-flip-flop 74 to be reset by the output of AND-gate 75 which is connected with outputs from the both lead-switch 35 closable and lead switch 34 openable as the locking bar 18 is situated at its locking position, output from RS-flip-flop 60 during the shaft-locking position is shaped in one-shot output circuit 60 and then delivered through both AND-gate 62 and OR-gate 63 to set-terminal of RS-flip-flop 64. Thus, the latter will deliver output from its Q-terminal through OR-gate 65 to amplifier 66, thereby relay 67 being activated at its "A"-terminal, so as to energize the drive motor 22.

By the actuation of motor 22, the bar 18 will elevate to its unlocking position. At this time, lead switch 34 becomes on under the influence of magnet 25, while other lead switch 35 remains off. Thus, AND-gate 73 will deliver output for setting of RS-flip-flop 74. Output will be delivered from the latter from its Q-terminal to the reserving terminal of AND-gate 76. At this time, the latter receives at the opposite inlet from RS-flip-flop 64 through its Q-terminal, and AND-gate 76 delivers its output through OR-gates 77 and 79, respectively, to RS-flip-flops 64 and 56 for resetting these both, thereby respective Q-terminals thereof becoming L-level. By this action, counter circuit 57 is cleared and will terminate its counting job.

Should the rod 18 be stuck in its locking position in engagement with the locking recess 11 of steering shaft 10 and thus be unable to move towards its unlocking position by certain or other accidental cause, the alarm circuit 55 will be actuated to issue an alarm signal in the following way.

When RS-flip-flop 64 is set in the aforementioned way, its Q-terminal output will be fed to OR-gate 65, AND-gate 76 and RS-flip-flop 56. Thus, RS-flip-flop 56 is set and H-level signal is fed to counter 57 at its clear terminal. Thus, the latter circuit will be reset and initiate to counter the input clock pulses. Even when a predetermined counting period should have been lapsed without initiation of transfer movement of the bar 18 from its locking to unlocking position, alarm circuit 55 will begin to deliver alarming signals under the action of the input signal from the counter circuit 55.

Figure 7:
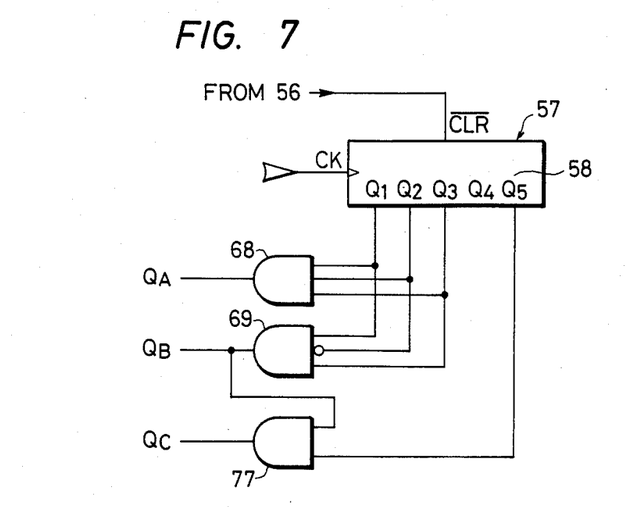
FIG. 7 is a circuit diagram of a counter employed.
Figure 8:
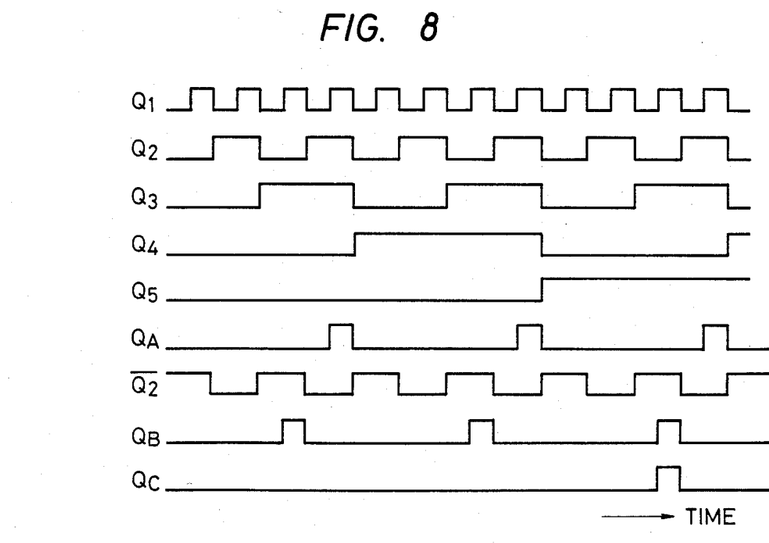
FIG. 8 is a timing chart showing the operation of the counter.

As shown more specifically in FIG. 7, the counter circuit 57 comprises a counter 58 adapted for reception of Q-terminal output of RS-flip-flop 56, as well as the clock signal; and AND-gates 68 and 69 connected respectively with output terminals $Q_1$–$Q_4$ of the said counter 58. From output terminals $Q_1$–$Q_5$, those signals shown specifically in the timing chart of FIG. 8 are delivered. AND-gates 68 and 69 will deliver output signals $Q_A$ and $Q_B$, respectively, upon reception of respective output signals delivered from output terminals $Q_1$–$Q_3$. AND-gate 69 differs from those which are foregoing in such a point that it receives $Q_2$-output signal at its reversing output terminal. AND-gate 77 receives $Q_B$- and $Q_5$-signals for delivery of $Q_C$-signal.

In order to let the output terminals $Q_1$–$Q_5$ deliver the required respective output signals by the commonly known flip-flop operation, the AND-gate 68 delivers $Q_A$-signal after about seven seconds counted from the initiation of counting operation at the counter 58 and generates again $Q_A$-output signal after about eight seconds.

AND-gate 69 will deliver $Q_B$-output signal after five seconds counted from counted from the said counting operation, and generate again $Q_B$-output signal after about eight seconds thereafter.

$Q_C$-output signal will be delivered after about twenty one seconds counted from the said initiation of the counting job, and simultaneously with the generation of $Q_B$-output signal.

It will be clear from the foregoing that if the shaft-locking bar 18 can not shift towards its unlocking position even if the RS-flip-flop 64 has been brought into its set-position, no reset signal will be delivered, from RS-flip-flop 74, and thus, RS-flip-flop 56 will continue its set-position and the counter 57 will count the clock pulses as before. Thus, upon lapse of the predetermined time period, $Q_B$-output signal will be generated.

This occurrence of $Q_B$-output signal generation will occur after such a time point where the motor has executed its regular unlocking rotation for urging the required locking bar retirement towards the unlocking position. By this reason, buzzer 81 will operate for a predetermined time period by actuation of exclusive OR-gate 80, and at the same time, a reset signal will be fed to RS-flip-flop 64 through OR-gate 77. Thus, the buzzer will alarm the vehicle driver that the locking bar is kept accidentally stuck into its locking position for the steering shaft and that it is necessary that the driver must manually turn the steering shaft forcibly, so as to make the stuck bar free. On the other hand, and by the resetting of RS-flip-flop 64, the amplifier 66 becomes off so that current supply to the motor will be terminated.

Upon lapse of a still further predetermined time period, $Q_A$-output signal will be delivered from counter 57 and RS-flip-flip 64 is set through OR-gate 63 and Q-terminal output signal will be generated.

Thus, current will be delivered through OR-gate 65, amplifier 66 and relay 67 to motor 22 which is, therefore, energized. When the driver so operates at this time to turn the steering wheen manually, the locking bar will be freeed from its stuck position. With the general circuit shown in FIG. 6, the foregoing operation will be repeated twice.

If the locking bar should not be freeed from its stuck position even when the foregoing twice bar-freeing operation has been executed, $Q_B$- and $Q_C$-output signals will be generated. With generation of the former signal $Q_B$, RS-flip-flop 64 is caused to set. And at the same time, with generation of $Q_C$-output signal fed through OR-gates 79 and 82, respectively, RS-flip-flops 56 and 60 are reset.

How many times the alarm circuit 55 should be operated and how long time such alarming operation should be continued, depends naturally upon the length of timing pulse and the circuit constants of each of the related gate circuits.

Therefore, by modifying the above design parameters, the number of reception times and the length of each operation period can naturally be modified as occasion may desire.

At the final stage where the both $Q_B$- and $Q_C$-outputs are generated simultaneously, exclusive OR-gate 80 does deliver no output signals, thus the buzzer 81 being unable to operate.

When RS-flip-flop 56 is brought to its reset position, counter circuit becomes cleared, thus the counting operation thereof being terminated.

When both RS-flip-flops 60 and 64 become reset, their respective Q-terminal outputs will be of L-level. Thus, the amplifier 66 will become off, and the relay 67 will change its operational position from "a" to "b"-contact. Therefore, the both end terminals of motor 22 are short-circuited through the related relay and the motor will be brought into a dead stop by the action of an attached braking unit, not shown.

When a shaft-unlocking action is executed with the regular rotation of motor 22, output signal of AND-gate 76 is fed through OR-gate 78 to setting terminal of RS-flip-flop 85, thereby the latter issuing its output signal from the attributed output terminal Q to AND-gate 86, three-state buffer 87 and amplifier 88 which will deliver its output, so as to close ignition circuit 90. The three-state buffer 87 will deliver its output signal when AND-gate 86 does deliver no output, the said output signal being fed through OR-gate 91 and amplifier 92 to accessary circuit 93 which is thus closed. It should be noted that the term "accessary" will be only briefly denoted by "ACC".

Input terminals of AND-gate 86 are kept in communication with RS-flip-flop 85, engine sensor 94 and keyboard botton switch array 45. The design condition of the general circuit shown in FIG. 6 is so selected that with the engine running at a higher rotational speed than that which has been predetermined, the engine sensor 94 is kept at L-level, while the engine is kept nearly or correctly in its stationary condition, the sensor is maintained at H-level.

During the stationary condition of the engine and with the RS-flip-flop 85 brought into setting, when any selected one of the buttons at keyboard 45 is being depressed, output continues to be delivered to AND-gate 86 which will be thus activated. The output of the latter will be forwarded through amplifiers 94 and 95, thereby starter circuit 96 and resister short circuit 97 are energized, so as to actuate the starter motor for starting of the engine.

At this time, and under the influence of output from AND-gate 86, ACC-circuit 93 will become off by the inverting action at three-state buffer 87.

However, when the vehicle engine, not shown, has once been started by the operation of AND-gate 86, the starter motor, not shown, can not be started even by depressing the conventional starting button switch, not shown, and indeed, because of the very existence of L-level output at the engine sensor 94.

On the other hand, if accidental application of outside noises or shocks should occur during practical running of the vehicle and upon the RS-flip-flop 85 acting to keep the ignition circuit 90 closed, thereby the flip-flop being forced to reset, the last-mentioned circuit will be opened and the engine will stop its revolution against the will of the vehicle driver. In such a case, a grave accident would be invited.

Provision is made of AND-gate 70 which will be actuated by simultaneous application of the output of RS-flip-flop 60 to be set by an shaft-unlocking signal, and of the output from the running sensor 98 adapted for delivery of L-level signal during the vehicle-running or of H-level signal during the vehicle-stoppage, and indeed, for the purpose of the shaft-unlocked position of the vehicle. As will be seen from FIG. 6, the gate 70 will deliver its output signal when it simultaneously receives H-level output signal from RS-flip-flop 74.

After execution of shaft-unlocking and during the vehicle-running, running sensor 98 originally delivers L-level output signal which is converted to H-level signal at the inverting action at AND-gate 70, the latter, therefore, continuing its output signal delivery to set terminal of RS-flip-flop 85 which can thus deliver its stable output signal.

As an alternative mode for closure of the ACC-circuit 93, keyboard switches 45 are depressed in a certain predetermined order for delivery of coded signal to comparator 51. When this coded input digits coincide with those already memoried in the memory 50, the output of coincidence signal output circuit 52 is fed to set terminal of RS-flip-flop 99 which is then brought into its set position for delivery of output signal from its Q-terminal. This output is then fed through OR-gate 91 and amplifier 92 to ACC-circuit 93 to close. In this way, the driver may enjoy a radio program without inputting an unlock instruction signal, and so on.

Shaft-locking circuit 46 comprises AND-gate 100, one-short circuit 101, AND-gate 102, RS-flip-flop 103 and AND-gate 104.

AND-gate 100 receives output from button switch board 45. One shot circuit 101 is triggered by the output from AND-gate 100. AND-gate 102 receives respective outputs from one shot circuit 101, RS-flip-flop 74 and running sensor 98. The output of AND-gate 102 is fed to the set terminal of RS-flip-flop 103, its output signal at the Q-terminal is fed to AND-gate 104 which will deliver its output signal upon reception of outputs from RS-flip-flop 103, engine sensor 94 and to OR-gate 65.

The shaft-locking circuit 46 can act when the vehicle has been caused to stop and the steering lock has been unlocked. More specifically, when two specifically selected push buttons of the board 45 are depressed, AND-gate 100 will deliver its output, thereby one shot circuit 101 delivering its output to AND-gate 102. When the vehicle is stationary at this time, AND-gate 102 will be on, its output being fed through OR-gate 82 to RS-flip-flop 60 which is thus reset. It's output at Q-terminal is at L-level, and AND-gate 70 becomes off. At the same time, RS-flip-flop 85 is caused to reset with the output signal of AND-gate 102, Q-terminal output of RS-flip-flop 85 becoming L-level, so as to let amplifier 88 and AND-gate 86 off. Therefore, both amplifiers 94 and 95 become non-conductive. Further, amplifier 92 becomes off through three-state buffer 87 and OR-gate 91.

At the same time, output signal from AND-gate 102 is fed to set terminal of RS-flip-flop 103 which is thus caused to set, Q-terminal output thereof being fed to AND-gate 104.

If, at this time, the engine is in its stationary position, the engine sensor 94 will deliver H-level output, so as to deliver an output from AND-gate 104 through OR-gate 65 to amplifier 66, the latter becoming thus on and relay arm 67 being transferred to "a"-contact for energizing the motor 22.

Figure 4:
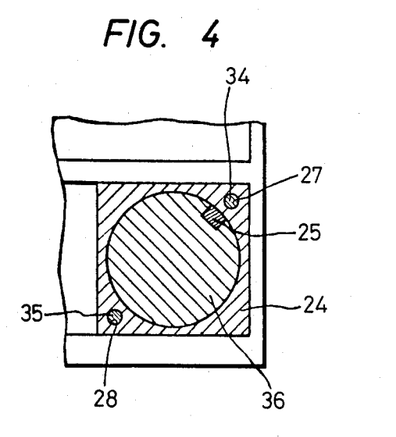
FIG. 4 is a sectional view along a section line A—A' shown in FIG. 2.

With revolution of this motor 22, motion is transmitted from the attached gearing unit 23 and its output shaft or -wheel will be turned clockwise 180 degrees from the position shown in FIG. 4 towards the shaft-locking position shown again therein. At the 180 degree-revolutional position, magnet 25 will act upon lead switch 35 so as to bring the latter into its on-position. At the shaft-locking position, as shown in FIG. 6, lead switch 34 is kept at off, while another other switch 35 is in its on-position. Therefore, AND-gate 75 will deliver an output so as to reset RS-flip-flop 74, thereby its Q-terminal output becoming nill. At the same time, RS-flip-flop 103 is caused to reset through OR-gate 71. Thus, its Q-terminal output will cease to deliver, so as to stop the revolution of motor 22.

When the ACC-circuit 93 has been exclusively brought to on and if it is desired to extinguish the circuit, depress either one of the specifically destined two button switches at the board 45 adapted for de-energizing the ignition circuit 90. When such button-depression has been made, its output will be delivered through OR-gates 105 and 106 to RS-flip-flop 99 which is therefore reset, thus terminating its R-terminal output for making, through OR-gate 91, the amplifier 92 non-conductive. The reset terminal of RS-flip-flop 99 receives now Q-output signal of RS-flip-flop 60 through OR-gate 106. This will serve to positively notify the vehicle driver the issuance of an alarm signal from the buzzer 81 of such fact that the locking bar 18 now stuck into the reception recess 11 on steering shaft 10.

After disengagement of the locking bar from its cooperating reception recess, RS-flip-flop 103 is set as in the foregoing explained manner, its output signal delivered is transmitted through three-state buffer 87 and OR-gate 91 to amplifier 92 which becomes thus conductive. It should be, however, noted that when the starter circuit 96 has been brought into actuation, the circuit 87 will become off.

Now turning to the operation of the whole arrangement shown, the vehicle driver depresses a predetermined switches arranged on the switch pannel 45 which is fixedly mounted on a vehicle door or a dashboard on the vehicle interior, the digits signal is compared at the comparator 51 with those which have beforehand intentionally been stored in the memory 50. When there is coincidence between the both in every successive digits, an output signal demonstrative of the coincidence will be delivered from coincidence signal generator 52 to RS-flip-flop 62 which is thus set. At this shaft-locking stage, RS-flip-flop 74 does not deliver no output signal from its Q-terminal, and RS-flip-flop 60 delivers its Q-terminal output which is transmitted through one shot output circuit 61, AND-gate 62 and OR-gate 63 to RS-flip-flop 64 which is then caused to set.

Now, Q-terminal output of RS-flip-flop 64 will be delivered through OR-gate 65 and relay 67 to motor 22 which is, therefore, activated. It's torque will be transmitted through gearing unit 23, output shaft or wheel; 36 and rotator 21 which acts, therefore, to elevate the locking bar 18 from its locking position to its unlocking one, and indeed, together with hanger 19 against the action of coil pressure spring 20. Generally speaking, the motor 22 may be of the unidirectional type. However, it may be replaced by a reversible type one.

At the shaft-locking position shown in FIG. 4, which has been brought about after a 180-degree revolution of the output shaft or -wheel 36, lead switch 35 is kept at off-position, while the opposite lead switch 34 has been brought into its on-position. At this time, ANDgate 73 delivers an output signal to RS-flip-flop 74 which is thus set. Q-terminal output of the latter will be fed to the reversing input terminal of AND-gate 62 which becomes thus off. Therefore, accidental malfunction of RS-flip-flop 64 by noise will be positively prevented. Input signal is also fed to the respective reset terminals of RS-flip-flops 64 and 56 which are thus reset.

In the case of stuck-in engagement of the bar 18 with the locking recess 11 on steering shaft 10, thereby great difficulty being provided for the execution of a shaft unlocking operation, alarm circuit 55 is caused to operate twice, indeed, with reception of the aforementioned input signal $Q_B$ and resetting therewith twice the RS-flip-flop 64, so as to energize the motor 22. If the said bar is still sticking till the last, output signal $Q_C$ will be delivered, thus resetting the both RS-flip-flops 56 and 60. At the same time, RS-flip-flop 64 is caused to reset by application of third delivery of $Q_B$-output. Therefore, the driver must depress again the selected buttons at 45 in the predetermined manner.

When the steering shaft lock has been unlocked, output signals delivered from Q-terminals of RS-flip-flops 64 and 74 to AND-gate 76 which delivers in turn output therefrom to OR-gate 78, so as to set RS-flip-flop 85. Thus, the ignition circuit 90 becomes on, while the ACC-circuit 93 is brought into on through three-state buffer 87 and OR-gate 91.

When the driver depresses the selected switches at 45, AND-gate 86 will turn on, starter circuit 96 and resister short circuit 97 become conductive, while the buffer 87 becomes temporaly off, thereby ACC-circuit being interrupted. When the engine is brought into operation, engine sensor 94 is at L-level, thus AND-gates 86 and 104 becoming off. Therefore, the engine starter circuit 96 becomes off, while the buffer 87 returns to on and ACC-circuit 93 is energized. Therefore, any false running of motor 22 by accidental noises and shocks is suppressed.

Further, during the running of the vehicle, running sensor 98 is kept in its output at L-level for maintaining RS-flip-flop 60 at its setting condition. In this position, AND-gate 70 delivers continuously set signal through OR-gate 78 to RS-flip-flop 85 for the prevention of making the ignition circuit 90 off during the running period of the vehicle.

After intentional termination of the vehicle running, and when the driver intends to lock the steering shaft 10, he must depress specifically selected two button switches at 45 simultaneously, thus an instruction signal will be fed successively through AND-gate 100 and one shot circuit 101 to AND-gate 102 which, therefore, delivers its output. Then, signal is fed through OR-gate 82 to RS-flip-flop 60, thus the latter terminating its Q-terminal delivery.

At the same time, output from AND-gate 102 will be fed to reset terminal of flip-flop 85, so as to terminate its Q-terminal output for putting the both ignition circuit 90 and accessary circuit 93 off. By this function, the engine will cease automatically its operation.

On account of these deeds, engine sensor 94 will deliver an output of H-level. Output from AND-gate 102 is fed to RS-flip-flop 103 at its set terminal. Its Q-terminal output and output from engine sensor 94 are fed to AND-gate 104, and an instruction signal is fed therefrom through OR-gate 65 to motor circuit 41, so as to energize the motor 22. With rotation of the motor 22, its output shaft or -wheel 36 will be rotated 180 degrees clockwise in FIG. 4 from the shaft-unlock-position corresponding to FIG. 5. Therefore, slide switch 34 is brought off, while lead switch 34 will become on on account of access to magnet 25.

Therefore, AND-gate 75 delivers output therefrom, so as to bring RS-flip-flops 74 and 103 into setting. At the same time, the rotator 21 has been rotated to the shaft-locking position shown in FIG. 5, thereby hanger 19 and bar 18 being advanced under the action of coil spring 20, until the bar is brought into intimate engagement with reception recess 11 on steering shaft 10.

The embodiments of the invention in which an exclusive property or privilege is claimed are as follows:

1. A keyless steering shaft lock arrangement, said arrangement comprising:
    a frame,
    an electric motor,
    a gearing unit mounted in said frame and operatively connected with said electric motor;
    a rotator operatively connected with said gearing unit; and
    a rod movable between a locking and an unlocking position to engage with and disengage from a reception recess on the steering shaft depending upon rotational position of said rotator, said gearing unit including magnet means mounted thereon, and switches energizable by proximity to said magnet means, said switches being connected to an electronic control circuit adapted for controlling the locking and unlocking movement of said bar.

2. A keyless steering shaft lock arrangement of claim 1, wherein said switches includes a pair of elements arranged diametrically opposite to each other relative to a center of said gearing unit, said elements being energized by one and the same magnet defining said magnet means.

3. A keyless steering shaft lock arrangement of claim 1, wherein said switches are lead switches.

4. A keyless steering shaft lock arrangement for an automotive vehicle, said arrangement comprising:
    a stationary frame mounted on the vehicle,
    an electric motor mounted in said frame,
    a reduction gearing mounted in said frame and operatively connected with said motor,
    an output shaft mounted in said frame and operatively connected with said reduction gearing,
    a rotator mounted in said frame and mechanically coupled with said output shaft,
    a sector cam defined by said rotator,
    a spring biased hanger kept in pressure contact with said sector cam,
    a slidable shaft-locking and shaft unlocking bar engageable with the steering shaft, said sector cam having a semi-circular cam surface for holding said bar at an unlocking position and having another cam surface including a rounded apex and a pair of outwardly angled side edges for holding said bar at a locking position, and
    a first and a second switch arranged at diametrally opposite positions for magnetically sensing two opposite rotary positions of said output shaft for steering shaft unlocking and locking, said first switch and said second switch being connected to an electronic control circuit adapted for controlling the locking and unlocking movement of said bar.

5. The arrangement of claim 4, further comprising a lock-unlock sensor comprising a battery, said first and said second switches, two AND-gates connected therewith, and a RS-FLIP-FLOP connected with said two AND-gates.

6. The arrangement of claim 5, further comprising an unlock circuit arranged to receive an output from an unlock signal generator, thereby to deliver said output from said unlock signal generator to a motor circuit for controlling said motor.

7. The arrangement of claim 5, further comprising a stick-prevention circuit for energizing an alarm when said bar remains stuck in said locked position despite said bar being driven towards said unlocking position.

8. The arrangement of claim 7, wherein said stick-prevention circuit comprises an unlock circuit for transmitting an output from said unlock signal generator to said motor circuit, a timer circuit for counting the time period after output generation at said unlock circuit and for delivery of a trigger signal back to said unlock circuit, and an alarm circuit which is caused to operate upon reception of an output from said timer circuit.

9. The arrangement of claim 7, wherein said rounded apex includes an apex angle in the order of about 90 degrees.

* * * * *